US008321700B2

(12) United States Patent
Ghosh et al.

(10) Patent No.: US 8,321,700 B2
(45) Date of Patent: *Nov. 27, 2012

(54) USING A SINGLE TERMINAL FOR A POWER ENABLE OUTPUT SIGNAL AND DETECTING AN OVER-CURRENT CONDITION

(75) Inventors: Atish Ghosh, Austin, TX (US); Hans Magnusson, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/315,868

(22) Filed: Dec. 9, 2011

(65) Prior Publication Data
US 2012/0084578 A1    Apr. 5, 2012

Related U.S. Application Data

(63) Continuation of application No. 12/360,760, filed on Jan. 27, 2009, now Pat. No. 8,156,352.

(51) Int. Cl.
*G06F 1/28* (2006.01)

(52) U.S. Cl. .................... 713/300; 713/340; 710/305

(58) Field of Classification Search ............... 713/300
See application file for complete search history.

(56) References Cited

U.S. PATENT DOCUMENTS

| 5,289,060 A * | 2/1994 | Elnashar et al. ............ 327/552 |
| 6,362,610 B1 * | 3/2002 | Yang ............................ 323/281 |
| 6,516,418 B1 * | 2/2003 | Lee ............................. 713/320 |
| 7,497,737 B2 * | 3/2009 | Mikolajczak et al. ... 439/620.29 |
| 7,506,219 B2 * | 3/2009 | Bhesania et al. ............. 714/57 |
| 7,565,557 B2 * | 7/2009 | Wang et al. ................. 713/300 |
| 2005/0052797 A1 * | 3/2005 | Yan ............................... 361/18 |
| 2006/0117195 A1 * | 6/2006 | Niwa et al. ................. 713/300 |
| 2007/0079157 A1 * | 4/2007 | Wang et al. ................. 713/300 |
| 2007/0088964 A1 * | 4/2007 | Lee ............................ 713/300 |
| 2009/0097178 A1 * | 4/2009 | Krishnan et al. ............. 361/86 |
| 2009/0251837 A1 * | 10/2009 | Fiebrich et al. ............ 361/93.9 |

OTHER PUBLICATIONS

"Universal Serial Bus Specification Revision 2.0"; Compaq, Hewlett-Packard, Intel, Lucent, Microsoft, NEC, Philips; Apr. 27, 2000; pp. 171-178.

* cited by examiner

*Primary Examiner* — Ryan Stiglic
(74) *Attorney, Agent, or Firm* — Meyertons Hood Kivlin Kowert & Goetzel, P.C.; Jeffrey C. Hood; Joel L. Stevens

(57) ABSTRACT

A power controller for a peripheral bus interface. A peripheral bus power controller includes a first terminal, a second terminal coupled to receive an power enable input signal from a host controller, and a third terminal coupled to provide an over-current output signal indicative of an over-current condition to the host controller. The peripheral bus power controller further includes an enable circuit configured to assert a power enable output signal on the first terminal responsive to receiving the power enable input signal and a first buffer configured to provide the over-current output signal to the host controller responsive to the power controller detecting the over-current condition on the first terminal.

15 Claims, 4 Drawing Sheets

US 8,321,700 B2

USING A SINGLE TERMINAL FOR A POWER ENABLE OUTPUT SIGNAL AND DETECTING AN OVER-CURRENT CONDITION

This application is a continuation of U.S. patent application Ser. No. 12/360,760, titled "Single Pin Port Power Control" filed Jan. 27, 2009, now U.S. Pat. No. 8,156,352, whose inventors were Atish Ghosh and Hans Magnusson, which is hereby incorporated by reference in its entirety as though fully and completely set forth herein.

FIELD OF THE INVENTION

This invention relates to computer systems, and more particularly, to providing power through peripheral interface ports.

DESCRIPTION OF THE RELATED ART

The Universal Serial Bus (USB) standard provides a standard to interface peripheral devices to computer systems. More particularly, the USB standard provides a means for connecting a wide variety of devices to computer systems quickly and easily. Some devices that may be coupled to a computer system through a USB port, such as a printer, may provide their own power. Other devices (e.g., flash memory drives, game controllers, etc.) may receive power from the USB port.

Power may be provided to a USB-compatible peripheral device through a USB power switch. FIG. 1 illustrates an example of a configuration for providing power to a USB device through a USB power switch. In the embodiment shown, USB power switch 15 is coupled to receive a power enable signal through the EN input pin. The enable signal may be generated by a host controller which provides the PRTPWR signal to USB power switch 15 via buffer 12A. Responsive to an assertion of the enable signal, USB power switch 15 will provide power to USB device 20.

USB power switch 15 is configured to shut down if an over-current condition occurs. When an over-current condition is detected, the low over-current sense signal (OCS-bar) is driven low, through buffer 12B, to a USB host controller. The USB host controller may respond by de-asserting the PRTPWR signal, thereby turning off power to USB device. A resistor R1 is also provided in the embodiment shown, coupled between a voltage supply (3.3 v in this example) and the OCS pin, as the OCS signal in this embodiment is provided through an open drain output.

Buffers 12A and 12B may be implemented, along with other circuitry, on an integrated circuit (IC) in an IC package. The power enable signal and the over-current signals are each conveyed to and from the integrated circuit, respectively, through separate pins of the IC package. The configuration also utilizes an external resistor (R1 in this embodiment), which may be implemented in a USB hub. Accordingly, two separate IC package pins and an external resistor are required to implement the functionality in accordance with FIG. 1.

SUMMARY OF THE INVENTION

A power controller for a peripheral bus interface is disclosed. In one embodiment, a peripheral bus power controller includes a first terminal, a second terminal coupled to receive an power enable input signal from a host controller, and a third terminal coupled to provide an over-current output signal indicative of an over-current condition to the host controller. The peripheral bus power controller further includes an enable circuit configured to assert a power enable output signal on the first terminal responsive to receiving the power enable input signal and a first buffer configured to provide the over-current output signal to the host controller responsive to the power controller detecting the over-current condition on the first terminal.

A computer system is also disclosed. In one embodiment, the computer system includes a peripheral bus host controller and at least one peripheral port coupled to a peripheral bus and the host controller, wherein the at least one peripheral port includes a peripheral bus power controller. The peripheral bus power controller includes a first terminal of the peripheral bus power controller, a second terminal coupled to receive a power enable input signal from the host controller, and a third terminal coupled to provide an over-current output signal indicative of an over-current condition to the host controller. The peripheral bus power controller further includes a first circuit configured to assert a power enable output signal on the first terminal responsive to receiving the power enable input signal and a second circuit configured to provide an over-current output signal to the host controller responsive to the power controller detecting the over-current condition on the first terminal.

In one embodiment, the peripheral bus power controller is implemented on an integrated circuit (IC) in an IC package. The first terminal of the peripheral bus power controller may be implemented as a single signal pin of the IC package. More particularly, the power enable output signal is driven on the same pin which is used to detect an over-current condition. Accordingly, the power enable and over-current sense functions are combined onto a single pin of the IC package, instead of using two separate pins. This may result in the ability to implement the IC package with a reduced pin count. Alternatively, an IC could be designed to implement the peripheral bus power controller and to provide additional functionality through the extra pin that may be available from combining the power enable and over-current sense functions onto a single pin. In addition, the use of an external resistor may also be eliminated. Accordingly, the peripheral bus power controller disclosed herein may result in cost savings due to implementation on a smaller IC package size or an IC package that has additional functionality.

BRIEF DESCRIPTION OF THE DRAWINGS

Other aspects of the invention will become apparent upon reading the following detailed description and upon reference to the accompanying drawings in which.

Figure 1:
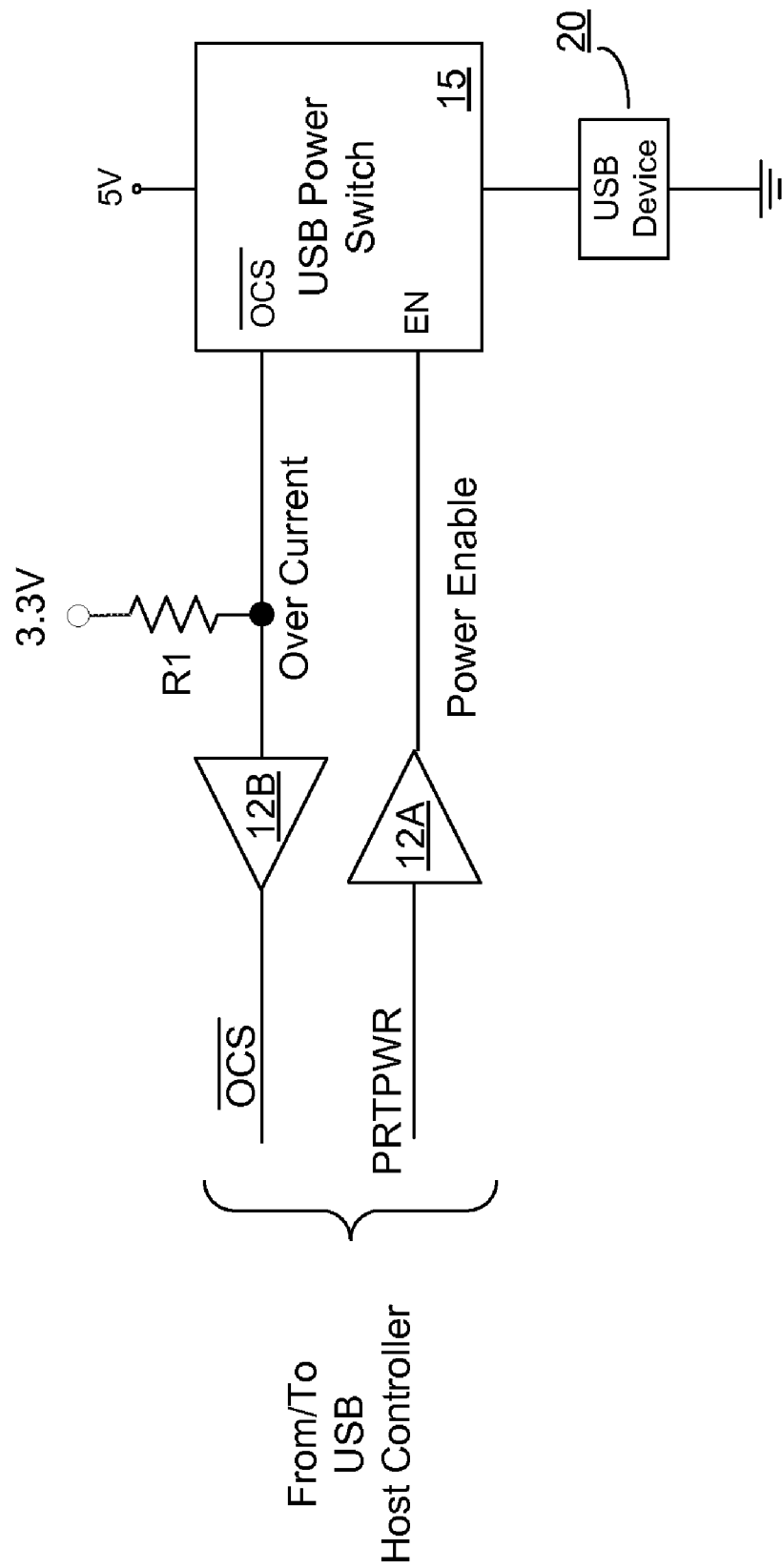
FIG. 1 (Prior Art) is a diagram of one embodiment of a circuit for providing power to a USB device through a USB port.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
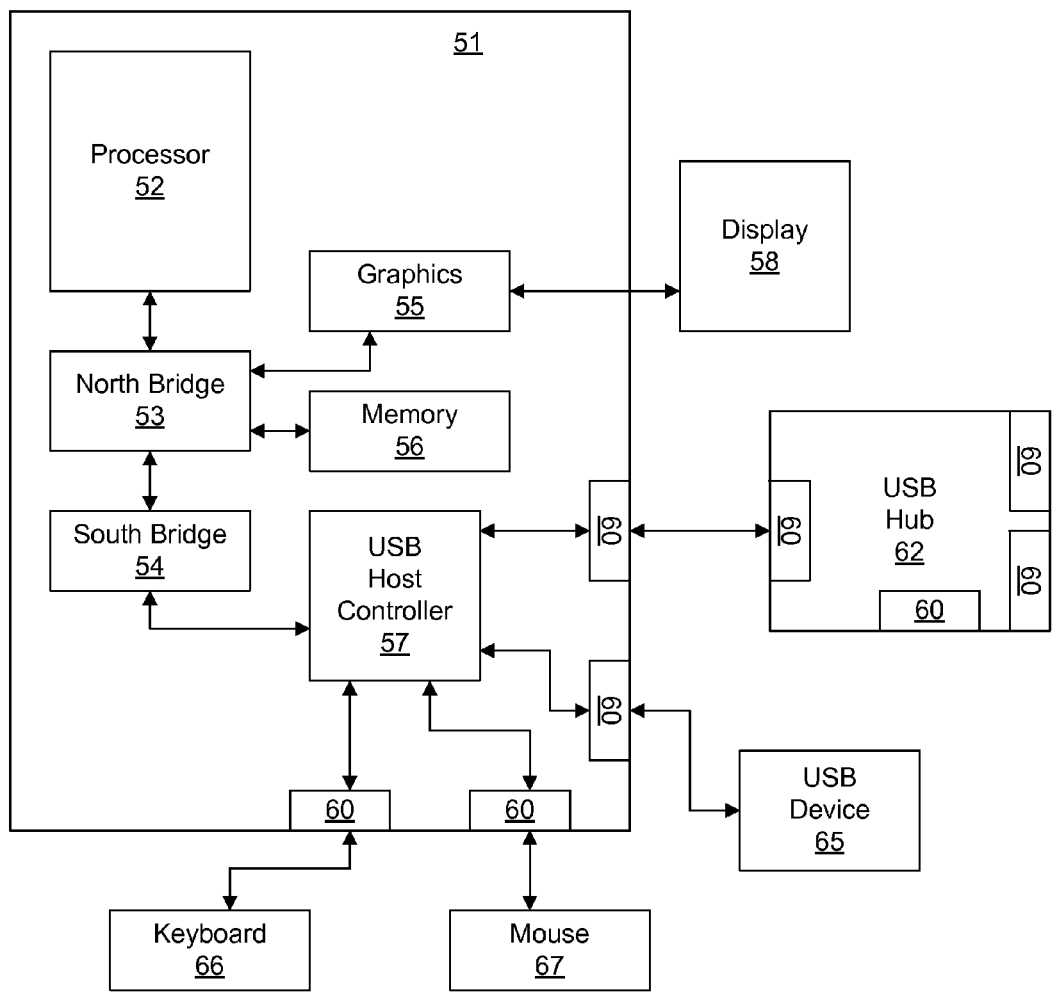
FIG. 2 is a block diagram of one embodiment of a computer system including a plurality of USB ports.

Turning now to FIG. 2, a block diagram of one embodiment of a computer system is shown. In the embodiment shown, computer system 50 includes a CPU unit 51, which may be a desktop case, a laptop case, or any other suitable housing for the components residing therein. CPU unit 51 includes a processor 52, which may be a single core processor or a multi-core processor, or other type of general-purpose processor. Processor 52 may also be a special purpose type of processor (e.g., digital signal processor), an application specific integrated circuit (ASIC), or other type of circuit that performs a processing function. Embodiments of CPU unit 51 having multiple processors are also possible and contemplated.

Processor 52 is coupled to a memory controller hub, which is shown here as North Bridge 53. North Bridge 53 is coupled to a graphics processing unit 55. Graphics processing unit 55 may be a specialized functional unit configured for processing graphics and display information for output to display 58.

In some embodiments, CPU unit 51 may utilize a processor 52 that includes a memory controller hub, and thus the presence of a separate North Bridge 53 may be unnecessary. Similarly, embodiments of a processor 52 that also include a graphics processing unit 55 are also possible and contemplated, which may obviate the need for a separate graphics processing unit.

North Bridge 53 is also coupled to a memory 56. In one embodiment, memory 56 includes a random access memory (RAM). Various types of memory may be used to implement the RAM, such as dynamic RAM (DRAM), double data rate (DDR) or DDR2 RAM, SRAM, and so forth. Memory 56 may also encompass hard disk storage, flash memory, or other types of non-volatile storage. In general, memory 56 may include the various types of memory implemented in CPU unit 51, including both volatile and non-volatile storage.

In addition to graphics processing unit 55 and memory 56, North Bridge 53 is also coupled to an I/O controller hub, South Bridge 54. South Bridge 54 is configured to provide an interface between various types of peripheral interfaces and the other components of CPU unit 51. In the embodiment shown, South Bridge 54 is coupled to a Universal Serial Bus (USB) host controller 57, which will be discussed in further detail below. South Bridge 54 may also be coupled to one or more other functional units that provide interfaces to other types of peripheral buses. Such buses may include, but are not limited to, peripheral component interface buses (PCI), Firewire (i.e. IEEE 1394), HyperTransport buses, and so forth. The functional units to provide interface for such buses are not shown here for the sake of simplicity.

In the embodiment shown, USB host controller 57 is configured to provide an interface between a plurality of USB ports 60 within CPU unit 51 and the other elements of computer system 50, via South Bridge 54. Furthermore, USB host controller 57 is coupled to a USB hub 62 via one of the USB ports 60 in the embodiment shown. In this configuration, USB host controller 57 serves as a root hub, while USB hub 62 provides additional USB ports 60 in order to enable the connection of additional USB devices (not shown). USB host controller 57 is configured to direct traffic flow to and from devices that may be coupled to any of the USB ports 60 shown in the drawing, including those of USB hub 62.

In the embodiment shown, computer system 50 includes a keyboard 66, a mouse 67, and a USB device 65 coupled to CPU unit 51 via a respective USB port 60. Keyboard 66 and mouse 67 are exemplary devices that may be coupled to a computer system via a USB port. Other such devices include (but are not limited to) printers, speaker systems, additional hubs (e.g., additional instances of hub 62), mass storage devices (e.g., hard drives), flash memory devices, various types of music an video players, display devices, and so forth. While some of these devices may provide their power (via batteries) or receive power from another source (e.g., through an electrical outlet), other devices may receive power through the USB port to which it is to be coupled.

In addition to various embodiments of the computer system discussed above, the disclosure may apply to virtually any other device in which a peripheral bus may be coupled to, e.g., a PDA, cell phone, other hand held device. Some of these devices may also double as hubs for a host computer system (e.g., a flat panel display or printer having extra USB ports implemented thereon).

Figure 3:
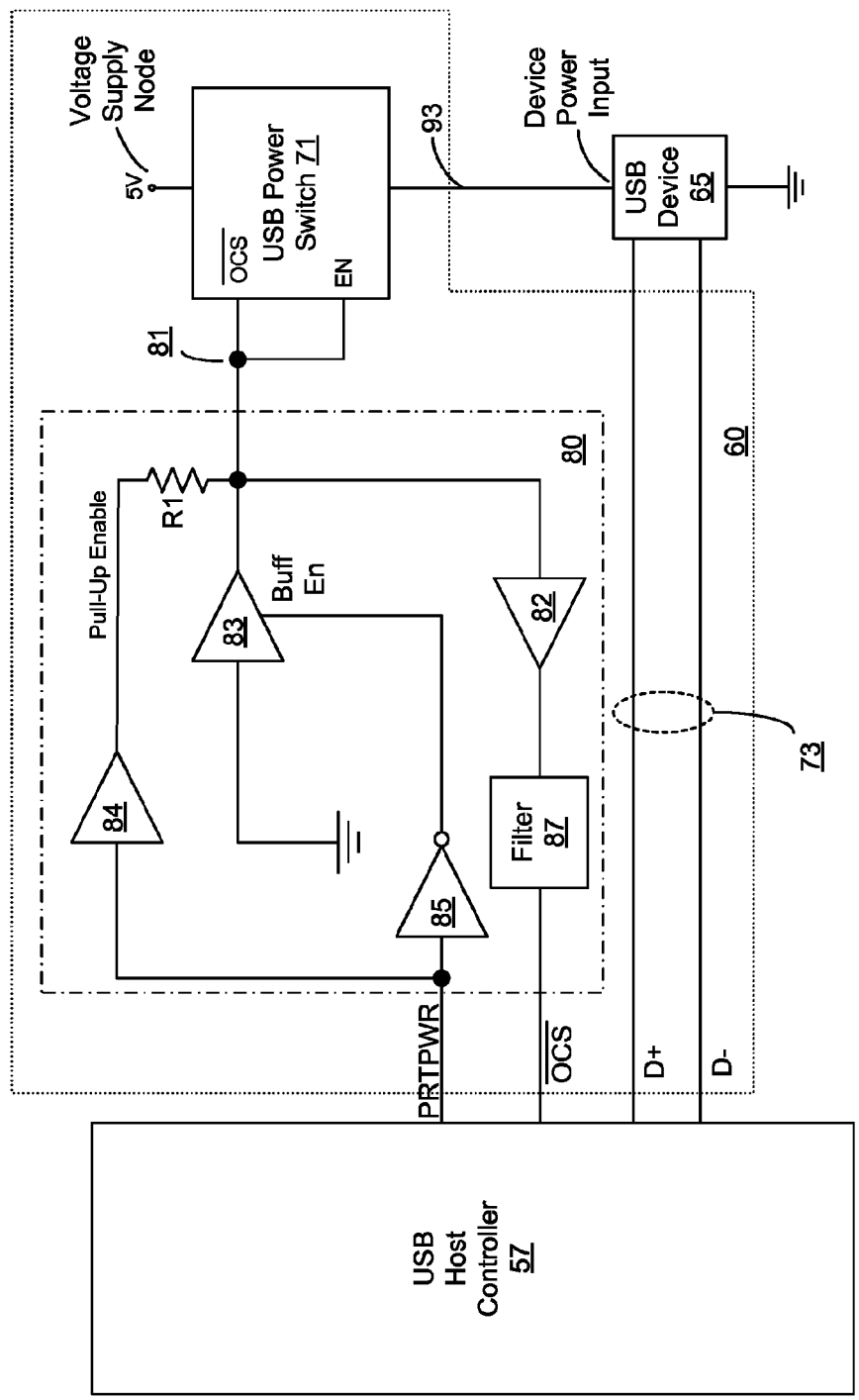
FIG. 3 is a block diagram of one embodiment of a circuit for providing power to a USB device through a USB port.

Turning now to FIG. 3, a block diagram of one embodiment of a circuit for providing power to a USB device through a USB port is shown. In the example shown, a USB port 60 is an exemplary embodiment of one of the USB ports 60 discussed above with reference to FIG. 2. USB port 60 includes USB power controller 80, which is coupled to a USB host controller 57 (which may be the same or similar to that discussed above). USB power controller 80 may be implemented as an integrated circuit (IC) in an IC package that is comprised within USB port 60 (or associated therewith). Accordingly, as shown in FIG. 3 (and FIG. 4 as well), USB power controller 80 may be considered to be an IC implemented on a package, with its various input, output, and I/O terminals corresponding to pins of an IC package.

USB port 60 also includes a USB power switch 71 coupled to USB power controller 80. USB power switch 71 is configured to switch power on or off according to a signal received through the 'EN' input. An exemplary USB device 65 is shown as being coupled to USB port 60, through power switch 71 (in order to receive power provided from USB port 60) and through complementary data lines D+ and D− of data bus 73. USB port 60 provides physical connection for providing a data path between USB device 65 to USB host controller 57 via data bus 73.

In the embodiment shown, USB power controller 80 is coupled to receive a power enable input signal (PRTPWR) from USB host controller 57, and further configured to provide an over-current output signal (OCS-bar) that is indicative of the detection of an over-current condition. USB power controller 80 is further configured to provide a power enable output signal on node 81, and is further configured to sense an over-current condition on node 81. By using node 81 to provide an output power enable signal and as a node for sensing an over-current condition, USB power controller 80 combines on one IC package pin (or node) the functions that required two IC package pins (or nodes) in the prior art.

For certain types of USB devices, power from the USB port may not be required. When a given USB device is first coupled to a USB port, the USB device and the USB host controller coupled to the USB port may exchange information. This information exchange may include the host controller determining whether the USB device is to receive power through the USB port to which it is coupled.

In the example of FIG. 3, if USB device 65 is configured to receive power from a source other than USB port 60, USB host controller 57 may hold the PRTPWR signal inactive. In this particular embodiment, the PRTPWR signal is active high, and thus, inactive low. When the PRTPWR signal is inactive low, the output of inverter 85 is a logic high. The logic high from the output of inverter 83 is provided to the buffer enable (BUFF EN) input of buffer 83. The input of buffer 83 is coupled directly to ground. Accordingly, when buffer 83 is enabled, its output is a logic low and thus node 81 is held to a logic low. Since node 81 is held low, the enable input of USB power switch 71 ('EN') is also low. Accordingly, power switch 71 will be turned off responsive to the low on the 'EN' input. Although node 81 may be held low in this situation, host controller 87 may ignore the OCS-bar signal, since USB device is not requesting power through the USB port.

If USB host controller 57 determines that USB device 57 is to receive power via USB port 60, it may respond by asserting the PRTPWR signal. As previously noted, this signal is active high. When PRTPWR is high, the output of inverter 85 is held low, and as a result, buffer 83 is disabled and thereby prevented from driving a low onto node 81. The high PRTPWR signal is propagated to the input of buffer 84, which provides a logic high as an output thereto, on the node labeled 'Pull-Up Enable.' When buffer 84 provides a logic high on this node, node 81 is pulled up through resistor R1 (which may be implemented on an IC along with the other components of USB power controller 80). This results in a logic high on node 81, which is propagated to the 'EN' input of USB power switch 71. USB power switch 71 in this embodiment is configured to switch power on responsive to receiving a logic high on the 'EN' input. In this example, USB power switch is coupled to a 5V source on the voltage supply node. Accordingly, when USB power switch 71 is on, 5V power is provided to USB device 65 through its corresponding device power input.

If for some reason USB device 65 begins to draw an amount of current that exceeds the rating of USB power switch 71 (e.g., due to a short circuit or device malfunction), an over-current condition results. This over-current condition may result in the over-current sense output of USB power switch 71 (OCS-bar) falling low, with node 81 also falling low. When node 81 is low, USB power controller 80 will provide the over current sense output signal, OCS-bar (which is active low), to host controller 57, via buffer 82. Host controller 57 is configured to de-assert the PRTPWR signal responsive to receiving the OCS-bar signal.

In the embodiment shown, filter 87 is coupled between buffer 82 and the output node in which the OCS-bar signal is conveyed from USB power controller 80 to USB host controller 57. In the embodiment shown, filter 87 may be used to monitor glitches (e.g., power transients or fluctuations) that may occur when power is first applied through USB power switch 71. For example, if filter 87 detects only a single glitch, it may effectively filter out the glitch so that the OCS-bar output signal remains inactive (i.e. a logic high in this embodiment). However, if a series of glitches occurs (e.g., two or more), which may indicate that power provided through USB switch 71 is unstable, filter 87 may drive the OCS-bar output signal low, thereby causing USB host controller 57 to de-assert the PRTPWR signal. Accordingly, embodiments that utilize a filter such as filter 87 may allow time for power to stability once applied to USB device 65 via USB power switch 71. However, it is noted the embodiments wherein no filter is used (and thus the output of buffer 82 is coupled directly to USB host controller 57) are also possible and contemplated.

Figure 4:
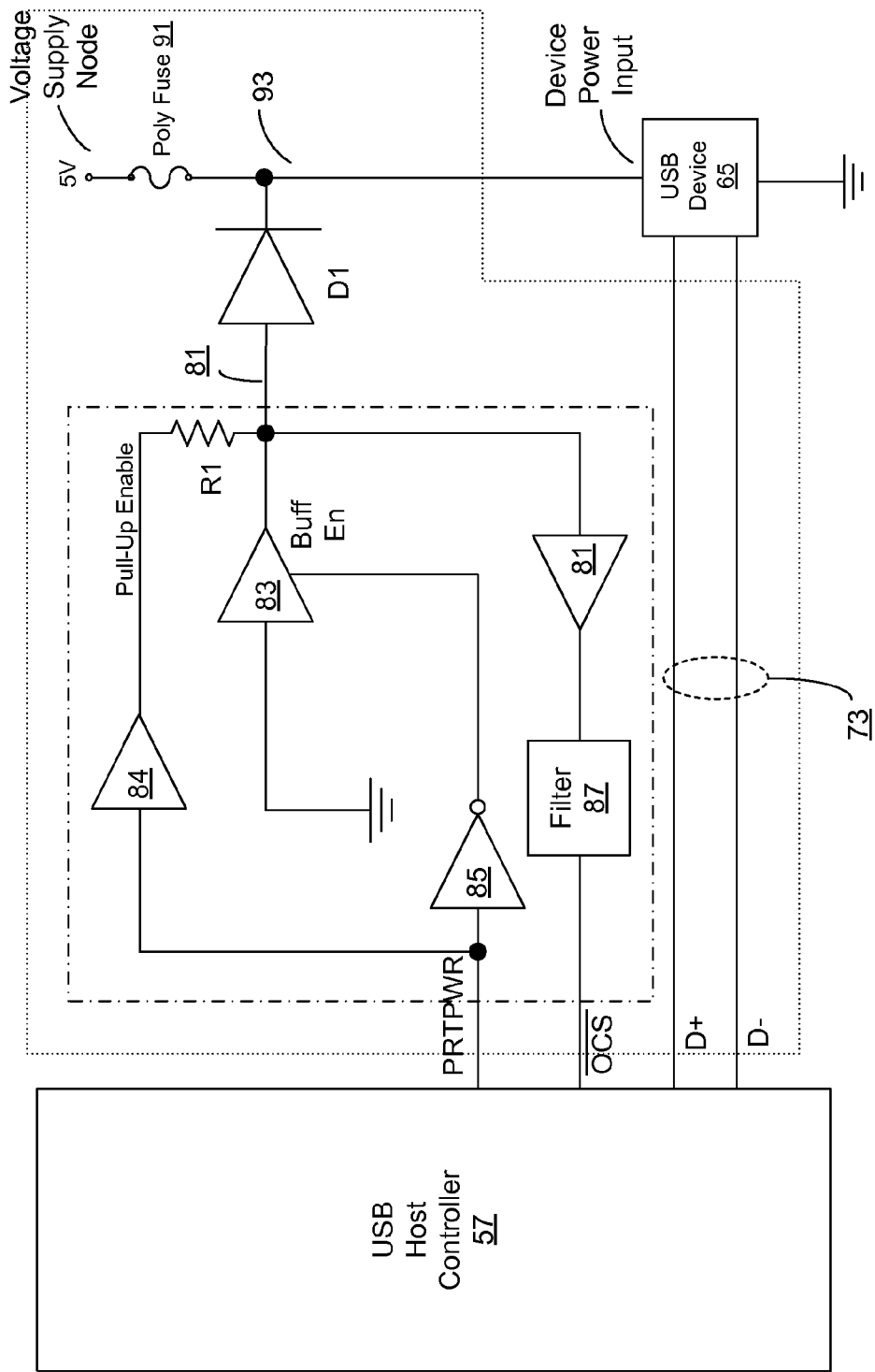
FIG. 4 is a block diagram of another embodiment of a circuit for providing power to a USB device through a USB port.

FIG. 4 is a block diagram of another embodiment of a circuit for providing power to a USB device through a USB port. For the sake of simplicity, elements in FIG. 4 that correspond to those of FIG. 3 are numbered identically, and may provide the same or similar functionality.

In example of FIG. 4, no USB power switch is present. Instead, power is provided from a voltage supply node via a resettable fuse, poly fuse 91, while USB power controller 80 is coupled to one terminal of the fuse via diode D1. In the embodiment shown poly fuse 91 is a fuse that is designed to open when current exceeds a rated current limit. In some embodiments, the amount of current flowing through poly fuse 91 may be proportional to the amount of heat generated as a result of this current. Accordingly, if the poly fuse 91 will open if the current through the fuse generates sufficient heat. After poly fuse 91 has opened, it may close again once the heat has sufficiently dissipated.

Diode D1 is coupled between node 81 and node 93. More particularly, the anode of diode D1 is coupled to node 81, while the cathode of diode D1 is coupled to node 93. In this particular connection, power will be provided from the 5V supply to USB device 65 as long as poly fuse 91 is closed. Accordingly, assertion of the PRTPWR signal in this embodiment does not enable power, although it may still be used to keep node 81 high, thereby preventing USB host controller 57 from receiving an erroneous indication of an over-current condition.

If an over-current condition occurs during the operation of USB device 65, poly fuse 91 will open, thus isolating node 93 from the 5V supply. When poly fuse 91 opens, the voltage on node 93 will fall to 0 V. As a result, the voltage on node 81 will also fall to 0 V plus any bias voltage of diode D1 (e.g., 0.7 V). Buffer 82 is configured to interpret this voltage as a logic low, and therefore drives an active low OCS-bar signal to USB host controller 57 (through filter 87).

The various embodiments of a USB power controller 80 described may provide certain advantages over prior art embodiments. As previously noted a single pin may be for conveying the power enable output signal to the power connection and receiving the over-current sense input signal from the power connection. By combining the power enable and over-current sense functions onto a single pin, embodiments of IC's implementing various embodiments of a USB power controller as discussed herein may utilize smaller IC packages. This may result in a significant cost savings per IC package. Alternatively, if one desires to use the same size IC package, additional functionality may be implemented thereon that may utilize the extra pin that was saved by combining the power enable and over-current sense functions onto a single pin.

While the various embodiments of a peripheral bus power controller discussed above have been described in the context of a USB environment, it should be noted that alternate embodiments may be used with different bus types. Such bus types may be serial buses or parallel buses, and may include any of the other bus types discussed above in reference to FIG. 2. In general, embodiments the peripheral bus power controller described herein may be used with any type of bus wherein power may be distributed via a port of the bus.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A peripheral bus power controller comprising:
   a first terminal of the peripheral bus power controller;
   a second terminal coupled to receive an power enable input signal from a host controller;

a third terminal coupled to provide an over-current output signal indicative of an over-current condition to the host controller;

an enable circuit configured to assert a power enable output signal on the first terminal responsive to receiving the power enable input signal; and a first buffer configured to provide the over-current output signal to the host controller responsive to the power controller detecting the over-current condition on the first terminal.

2. The power controller as recited in claim 1, wherein the power controller is implemented in an integrated circuit package having a plurality of pins, wherein the first terminal comprises one of the plurality of pins.

3. The power controller as recited in claim 1, further comprising a filter coupled to an output of the first buffer.

4. The power controller as recited in claim 1, wherein the power enable output signal is driven at a first logic level onto the first terminal, and wherein detecting an over-current condition includes detecting a second logic level on the first terminal.

5. The power controller as recited in claim 4, wherein the first logic level is a logic high level, and wherein the second logic level is a logic low level.

6. A computer system comprising:

a peripheral bus host controller; and at least one peripheral port coupled to a peripheral bus and the host controller, wherein the at least one peripheral port includes a peripheral bus power controller comprising:

a first terminal of the peripheral bus power controller;

a second terminal coupled to receive a power enable input signal from the host controller;

a third terminal coupled to provide an over-current output signal indicative of an over-current condition to the host controller;

a first circuit configured to assert a power enable output signal on the first terminal responsive to receiving the power enable input signal; and second circuit configured to provide an over-current output signal to the host controller responsive to the power controller detecting the over-current condition on the first terminal.

7. The computer system as recited in claim 6, wherein the peripheral bus power controller is implemented in an integrated circuit package having a plurality of pins, and wherein the first terminal is comprises one of the plurality of pins.

8. The computer system as recited in claim 6, wherein the peripheral port further includes a power switch coupled to the first terminal of the peripheral bus power controller, wherein the power switch is configured to provide power to a peripheral device coupled to the peripheral bus responsive to receiving the power enable output signal from the peripheral bus power controller.

9. The computer system as recited in claim 6, wherein the peripheral port further includes a resettable fuse coupled between a first voltage node and a second voltage node, and a diode having an anode coupled to the first terminal and a cathode coupled to the second voltage node.

10. The computer system as recited in claim 9, wherein the resettable fuse is configured to open responsive to an over current condition.

11. The computer system as recited in claim 6, further comprising a peripheral device coupled to the peripheral bus, wherein the peripheral device is coupled to receive power through the second voltage node.

12. The computer system as recited in claim 11, wherein the peripheral bus includes a true data signal path and a complementary signal data path.

13. The computer system as recited in claim 6, wherein the power enable output signal is driven at a first logic level onto the first terminal, and wherein detecting an over-current condition includes detecting a second logic level on the first terminal.

14. The computer system as recited in claim 13, wherein the first logic level is a logic high level, and wherein the second logic level is a logic low level.

15. The computer system as recited in claim 6, wherein the peripheral bus is a Universal Serial Bus.

* * * * *